Aug. 30, 1966 G. K. C. HARDESTY 3,270,201
PHOTO-LUMINESCENT DISPLAY MEANS
Filed March 3, 1964 10 Sheets-Sheet 1

INVENTOR
G. K. C. Hardesty

BY Birch and O'Brien

ATTORNEYS

FIG.4.
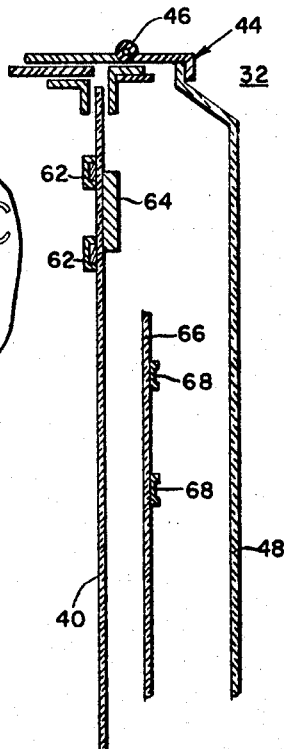
FIG.7.
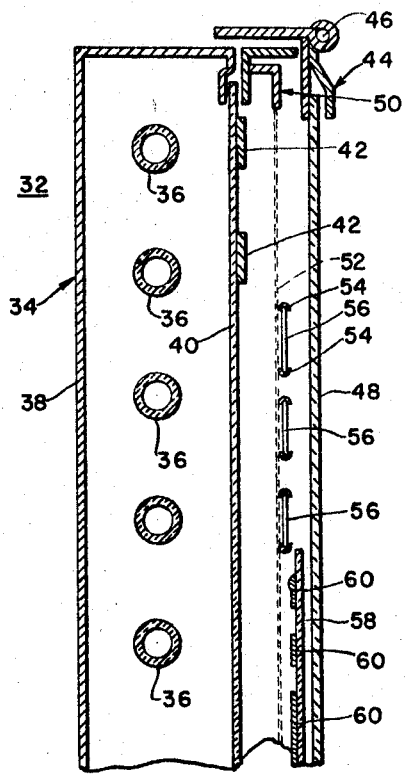
FIG.5.
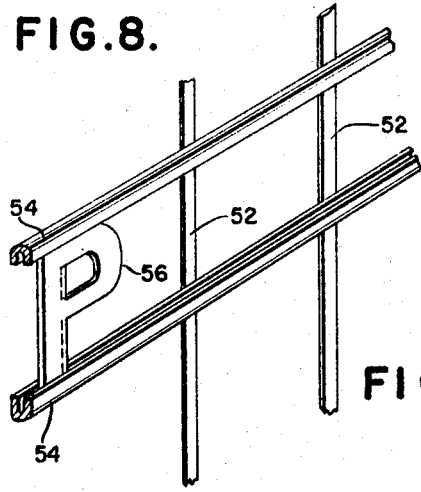
FIG.8.
FIG.6.
INVENTOR
G. K. C. Hardesty
BY Birch and O'Brien
ATTORNEYS Aug. 30, 1966    G. K. C. HARDESTY    3,270,201
PHOTO-LUMINESCENT DISPLAY MEANS
Filed March 3, 1964    10 Sheets-Sheet 4

INVENTOR
G.K.C. Hardesty

BY *Birch and O'Brien*

ATTORNEYS

INVENTOR
G. K. C. Hardesty

BY Birch and O'Brien

ATTORNEYS

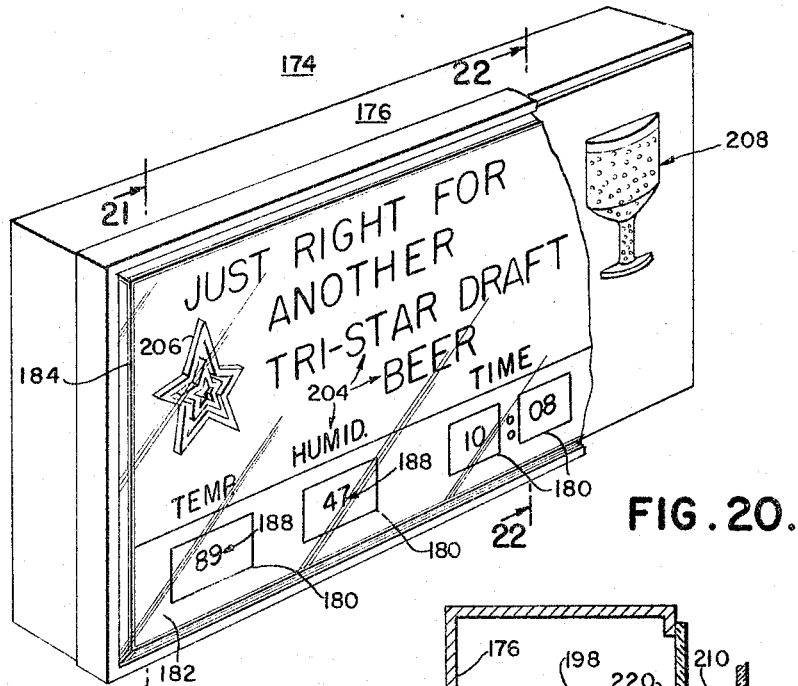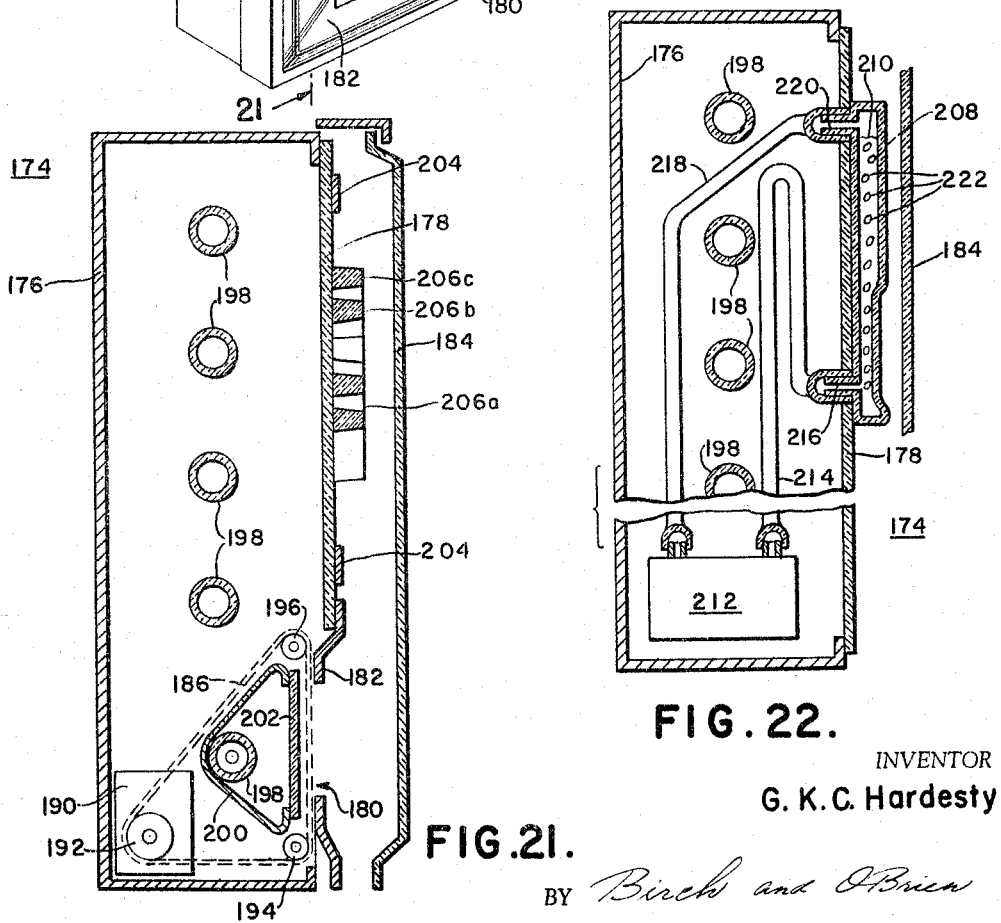

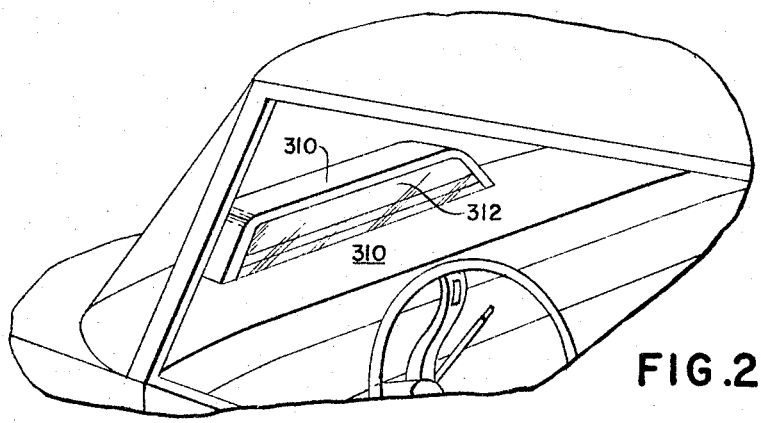
FIG. 27a.
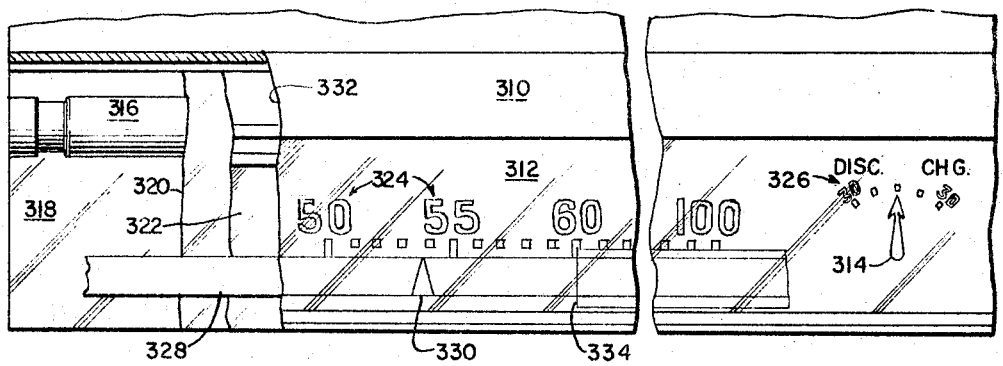
FIG. 27b.
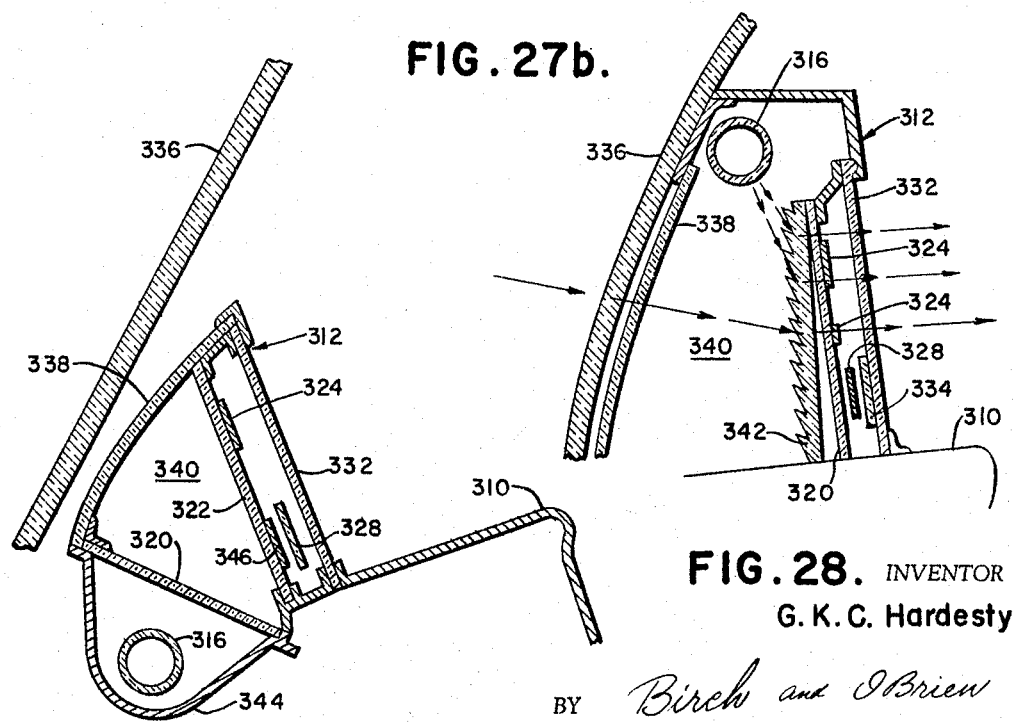
FIG. 28.
FIG. 29.
INVENTOR
G. K. C. Hardesty
BY Birch and O'Brien
ATTORNEYS

United States Patent Office 3,270,201
Patented August 30, 1966

3,270,201
PHOTO-LUMINESCENT DISPLAY MEANS
George K. C. Hardesty, Box 155, Mayo, Md.
Filed Mar. 3, 1964, Ser. No. 349,025
26 Claims. (Cl. 250—71)

This invention relates to illuminated display techniques and means for effecting these displays in which illuminated indicia and other representative aesthetic forms are visibly illuminated while positioned against an opaque background, the source being invisible from the obverse surface of the display.

The present invention is best illustrated in connection with "backlighted black field" displays. The term "backlighted" denotes the illumination of display indicia or other aesthetic forms from a light source located behind the obverse surface of the display. The said indicia and aesthetic forms may be comprised of fixed or movable letters, numerals, scales, pointers, indexing means, liquids, and art forms such as abstract sculptures, silhouettes, flowers and other objects.

The term "black field" denotes a completely black background over which the indicia and/or forms are positioned or arranged. Thus, by the practice of this invention sources of illumination used for "backlighted black field" displays and the like will be completely invisible to the eye of the viewer while being directly or virtually in his line of sight behind the black field background.

In the past, untold numbers of attempts have been made to present to viewers the effect of luminous objects against a completely black field. This is to be fully distinguished from the common practice of silhouetting such objects as the numerals and moving hands of a clock against a completely luminous field.

Heretofore, the illumination of moving objects on a completely backlighted black field has been considered to be a paradox, and no satisfactory solution to the problem had been found. By the present invention, such moving figures may be intensely and individually illuminated on a black field by backlighting.

It is, therefore an object of this invention to provide a novel means and method wherein backlighting may be utilized to effect individual illumination of fixed or moving objects over an opaque background, the source of illumination being completely invisible from the obverse side of the said objects.

It is another object of this invention to provide backlighted field displays.

Another object of this invention is to provide a novel means and method wherein backlighting may be utilized to effect individual illumination of fixed or moving objects over a black field, the source of illumination being completely invisible from the obverse side of said objects.

Still another object of this invention is to provide backlighted black field displays wherein the illuminated portions of the display are fluorescent.

Still another object of this invention is to provide backlighted black field displays comprising a source of illumination, a first light transmitting medium over said source transmitting a predetermined spectral bandwidth fixed or moving display objects of photoluminescent material adjacent said first transmitting medium excited into fluorescence by the light transmitted therethrough and a second light transmitting means, over the obverse surface of the display, having a sharp cut-off characteristic to the said predetermined spectral bandwidths whereby the said source is invisible and the display objects are luminously visible against a black field from the obverse surface of the display.

Yet another object of this invention is to provide backlighted black field displays comprising a source of illumination, a first light transmitting medium over said source transmitting a predetermined spectral bandwidth fixed and/or moving display objects of fluorescent material adjacent said first transmitting medium excited into fluorescence by the light transmitted therethrough and a second light transmitting means, over the obverse surface of the display, having a sharp cut-off characteristic to the said predetermined spectral bandwidth whereby the said source is invisible and the display objects are luminously visible against a black field from the obverse surface of the display; and wherein the said display objects can be treated at their obverse surfaces to provide a filtered output of the photoluminescence emitted therefrom, whereby a heretofore unachievable range of color selections is made available.

Yet another object of this invention is to provide black field illumination displays wherein all of the ambient or artificial illumination entering the displays from the obverse surfaces thereof is substantially totally absorbed.

These and other objects of this invention will become more fully apparent with respect to the following specification and drawings which relate to several preferred embodiments of the invention.

In the drawings:

FIGURE 4 is a partial plan view of a display panel of the present invention;

FIGURE 5 is a cross section taken along line 5—5 of FIGURE 4;

FIGURE 6 is an enlarged detail of a mounting means for the indicia of FIGURES 4 and 5;

FIGURE 7 is a cross section taken along line 7—7 of FIGURE 4 displaying another embodiment of indicia mounting means;

FIGURE 8 is an enlarged detail of the indicia of FIGURE 7;

FIGURE 20 is a perspective of a fourth embodiment of a special effects display means of the present invention;

FIGURE 21 is a cross section taken on line 21—21 of FIGURE 20;

FIGURE 22 is a cross section taken on line 22—22 of FIGURE 20;

FIGURES 27a and 27b are perspective and front plan views, respectively, of an automotive instrument panel including a speedometer and other instrumentation;

FIGURE 28 is a cross section taken along line 28—28 of FIGURE 27b; and

FIGURE 29 is a similar cross section of FIGURE 28 illustrating a second embodiment of the automotive instrument panel of FIGURE 27b.

Figure 2:
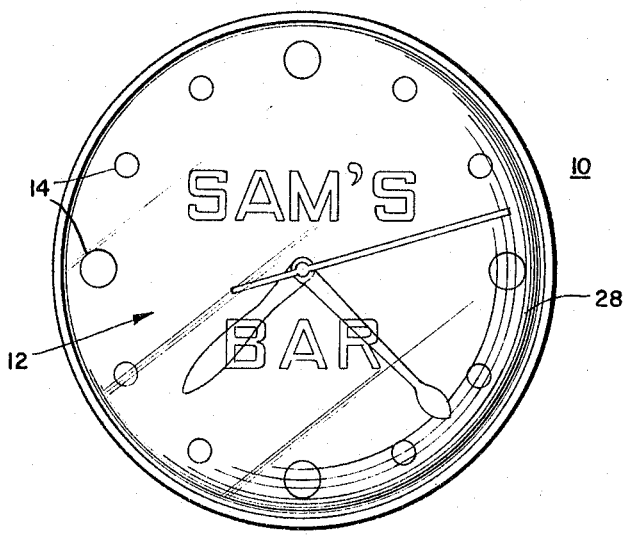
FIGURE 2 is a top plan view of the clock means in FIGURE 1.
Figure 3:
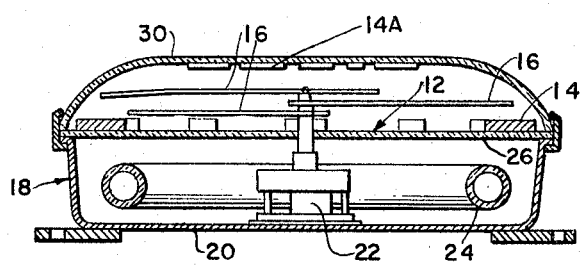
FIGURE 3 is a cross section of another embodiment of a clock means of the present invention.
Figure 1:
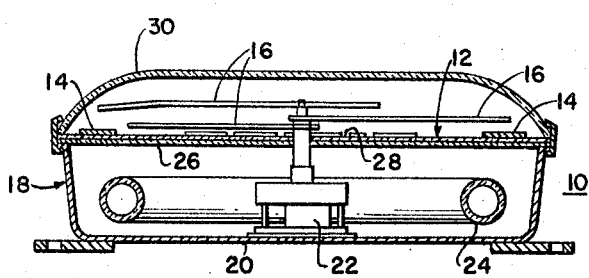
FIGURE 1 is a cross sectional view of a clock means embodying the present invention.

Referring in detail to the drawings and more particularly to FIGURES 1, 2 and 3, a first embodiment of the invention comprising backlighted black field clock means 10, the clock face 12 comprising a black field and the dial indicia 14 and the hands 16 being illuminated.

The clock means 10 further comprises a housing 18 having a rear face 20 on which is mounted a clockwork 22. Surrounding the clockwork 22 is a suitably energized fluorescent lamp 24 which may be of the circular commercial type providing ordinary white light which has a substantially high level of blue and near ultraviolet content or it may be of a second commercially available type of fluorescent circline lamp which has an optimum of photoluminescent exciting output and a minimum of energy output over the rest of the spectrum.

The housing 18 includes a forward wall comprising a blue first filter layer 26. The first filter layer 26 is an integral part of the clock face 12. The clock face 12 is completed by a transparent layer 28, such as clear acrylic plastic, on which the dial indications 14 are painted, debossed, embossed or otherwise integrally affixed thereto, the latter comprising photoluminescent material. The clock hands 16 also comprised of a photoluminescent material such as may be effected by clear acrylic plastic hands coated with photoluminescent paint or the like.

The housing 18 is completed by the use of a second filter layer 30 in the form of the clock crystal or dome. This second filter layer 30 has a sharp cut-off characteristic with respect to the blue end of the spectrum and transmits either from the green spectral region through the visible yellows and ambers and reds or solely the visible green or solely the red as desired.

The legend or indicia bearing numeral 14A in FIGURE 3, may be identical with the legend "SAM'S BAR" of FIGURE 2 and may therefore be composed of a light pervious material having a photoluminescent substance coated thereon or impregnated therein. The legend 14A can be provided in various physical embodiments and be permanently or detachably affixed to the inner surface of the outer filter 30 in similar manner to the mounting of the indicia 14 on the clock face 12.

Alternatively, as hereinafter more fully described with reference to FIGURES 12, 13 and 14, filter layer 30 can be so shaped and so proportioned as to transmit blue light adjacent or through certain areas thereof to provide a wider range of aesthetic effects on a caption 14A such as a Logo (a graphic trade symbol identity), the latter often having a highly significant and valuable color format identified with a business by the purchasing public.

Referring additionally to FIGURE 3, the clear acrylic layer 28 has been removed and the dial indications 14 of the clock 10 comprise individual photoluminescent laminations mounted directly on the first filter layer 26.

The source 24 may be an actual black light source such as the cold cathode convoluted tube type, but this invention renders this type of source unnecessary, the source 24 shown in FIGURE 1 being of the economical 22 or 32 watt-115 volt commercial "circuline" fluorescent lamp of the "daylight" "cool white" or "blacklight" variety.

Panel type displays

Backlighted black field illumination of directory panels and novel structural embodiments incorporated therein will now be described with reference to FIGURES 4, 5, 6, 7 and 8.

A display panel 32 in the form of a building directory is shown in its illuminated form in FIGURE 4, this being accomplished by ambient daylight and/or blacklighting under the present invention.

Referring additionally to FIGURE 5, the directory 32 includes a rear housing 34 containing a plurality of parallel fluorescent lamp source means 36, positioned between the rear wall 38 of the said housing and a blue first filter layer 40, the latter comprising the front wall of the housing 34.

The main indicia or heading 42 of the panel 32 may be integrally secured to the obverse surface of the first filter layer 40 such as by laminating as shown in FIGURE 5.

The panel 32 further includes a front cover assembly or frame 44 which is hinged at 46 to the housing 34 to be swung vertically, as shown, or in any suitable direction. The cover assembly 44 includes a second filter layer 48, having a sharp cut-off characteristic with respect to the blue end of the spectrum, covering substantially the entire obverse face of the panel 32.

Mounted intermediate the first and second filter layers 40 and 48, respectively, is an indicia support means 50 comprising a transparent plastic lattice 52 on which, referring additionally to FIGURE 6, are mounted mating pairs of opposed parallel channel members 54 for slidably retaining display indicia or forms 56. The channel members may also be of transparent plastic material, the various indicia all being photoluminescent, either throughout or by means of photoluminescent coatings. This latter concept is illustrated in the form of a rigid transparent sheet or flexible transparent film 58 suitably mounted between the said filter layers at the lower end of the display panel 32, indicia 60 being painted on one surface thereof in photoluminescent paint or the like.

Referring to FIGURES 7 and 8, an alternate means of supporting indicia between the first and second filter layers 40 and 48, respectively, is shown as comprising first, a plurality of parallel mounted strip magnets 62 on the back face of the first filter layer 40 for holding magnetic photoluminescent indicia 64 to the obverse surface of the said first filter layer; and second, a removable transparent supporting sheet 66 having a plurality of parallel magnetic tracks or channels 68 on the obverse face thereof spaced to receive small individual magnets 70 integral with various indicia characters 72, illustrated specifically as an upper case printed "A" in FIGURE 8.

An additional panel display means which is enhanced beyond all prior art expectations and capabilities is of the variable position coordinate plotting type, an embodiment of which, utilizing the Cartesian coordinate system, will now be described referring to FIGURES 9, 10 and 11.

The source of illumination for the coordinate plotting panel 74 comprises a plurality of parallel fluorescent lamps 76.

The panel 74 further includes first and second spaced apart filter layers 78 and 80; the said first filter layer 78 transmitting the blue end of the spectrum and being immediately adjacent the said lamps 76 between the said lamps and the second filter layer 80; the said second filter layer in turn having a sharp cut-off characteristic with respect to the blue end of the spectrum.

A selected plurality of transparent tape means 82 are mounted in parallel relationship and in vertical disposition across the obverse face of the first filter layer 78, the said tapes carrying photoluminescent coordinate point indicia 84. The coordinate points 84 may be positioned in the X-Y coordinate plane of the panel 74 by means of Y-coordinate controlling tape reels 86, illustrated as being in rectilinear housings 88, the reels being driven by square rotary shafts 90 connected to a suitable Y-drive apparatus (not shown) and the entire reel housings 88 being translatable along the said shafts 90 by X-coordinate drive chains 92 connected to a suitable X-drive apparatus (not shown).

Figure 9:
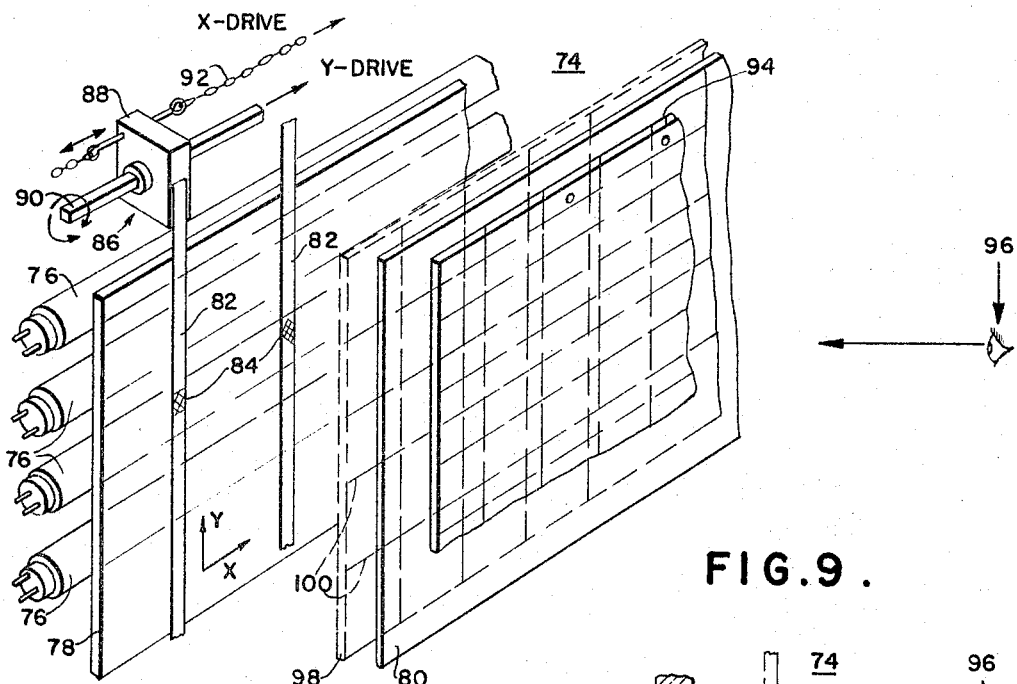
FIGURE 9 is an exploded perspective of a plotting board display panel of the present invention.

In the solid line embodiment shown in FIGURE 9, there is affixed to the obverse face of the second filter layer 80 a coordinate grid panel 94 illuminated in any desired color including blue by suitable edge lighting techniques such that ruled or inscribed coordinate grid markings on the rear face thereof are illuminated so as to be viewable at the obverse face of said grid panel 94.

Thus, the coordinate points 84 are viewable along with the coordinate (solid line) grid pattern on the grid plate 94 as illuminated indicia on a completely black field, the backlighting source being completely invisible but directly in line with the eye 96 of a viewer.

Figure 10:
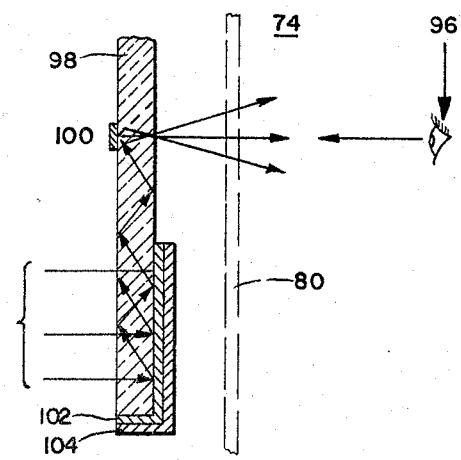
FIGURE 10 is an enlarged detail showing in partial cross section of another embodiment of FIGURE 9.

Another preferred embodiment comprises, as shown in dotted line position in FIGURE 9, and in detail in FIGURE 10, placing a transparent grid plate 98 with opaque white or colored grid markings 100 on the rear surface thereof, between the first and second filter layers 78 and 80, between the obverse surface of the coordinate points 84 and the said second filter layer 80, the said grid markings 100 having a much smaller surface area than the said coordinate points.

The grid plate 98 is edge-lighted in a new and novel manner under the present invention by the provision of a wrap-around coating or first layer 102 of photoluminescent material about the periphery of the plate and covering a small frame-like portion of the obverse surface of the said grid panel 98. Over the entire first layer 102 is a second layer 104 of reflective opaque material, whereby photoluminescence of the layer 102 resulting from energization thereof by light from the source 76 via the first filter layer 78 is not apparent from the obverse surface of the panel 74 to the eye 96 of a viewer but is substantially directed to provide an edge-lighting effect in panel 98 to illuminate markings thereon.

Thus, the grid indicia 100 and coordinate points 84 are displayed as illuminated objects on a completely black, backlighted field, the source 76 being invisible to the eye 96 of a viewer at the obverse surface of the panel 74.

Figure 11A:
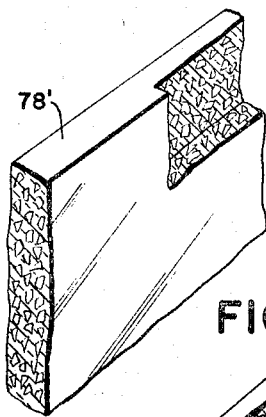
FIGURES 11a, 11b and 11c are details of other embodiments of the filter means of FIGURE 9.
Figure 11B:
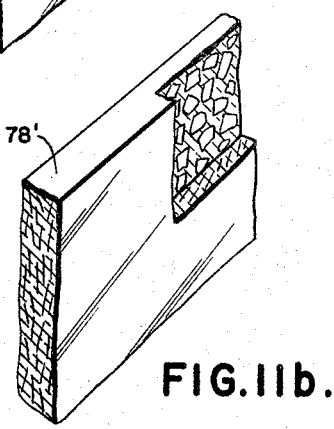
Figure 11C:
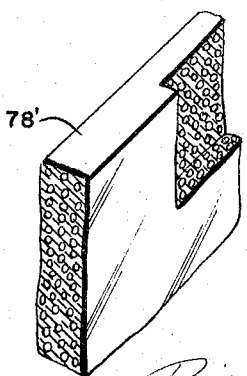

The first filter layer may be a variety of blue plastic or glass filters of the transparent of translucent variety or may be formed from blue acrylic bonded frit or an aggregate filter glass particles, beads or flakes such as illustrated in FIGURE 11 at 78'.

It is to be understood that with respect to panel type displays, the grid plates 94 and 98 may comprise polar plots, maps, preselected scenes and the like while the coordinate points 84 may comprise moving objects, animals, or the like moving on or across the various ambient concepts portrayed by the grid plates 94 or 98.

*Multiple and special effects displays*

Another category of display devices which may be materially enhanced by blackfield backlighting to produce heretofore unattainable visual effects for display and advertising purposes are those devices which may be classified as multiple and special effects displays of which several embodiments will now be described with reference to FIGURES 12, 13, 14, 15, 16, 17, 18, 19, 20, 21 and 22.

Figure 12:
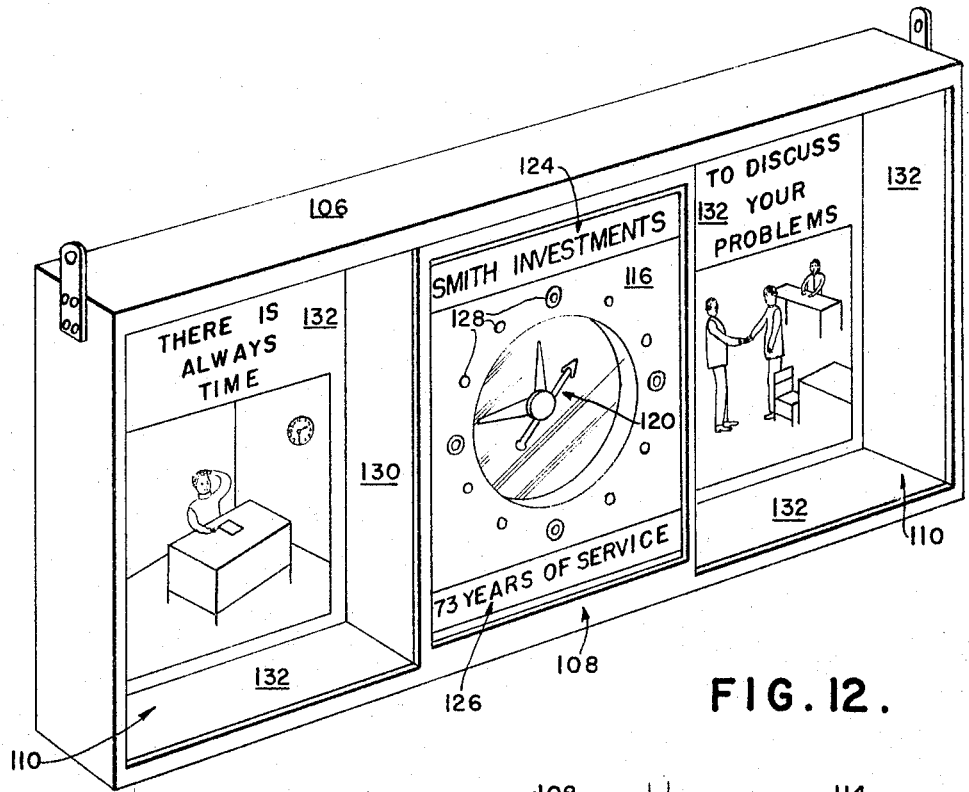
FIGURE 12 is a perspective of a first embodiment of a special effects display means of the invention.
Figure 13:
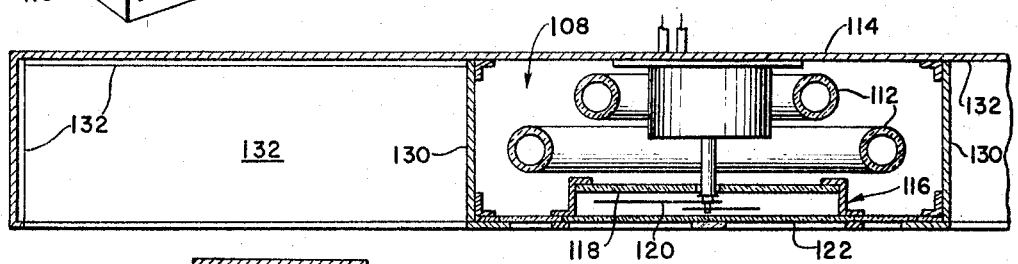
FIGURE 13 is a partial cross section taken along line 13—13 of FIGURE 12.
Figure 14:
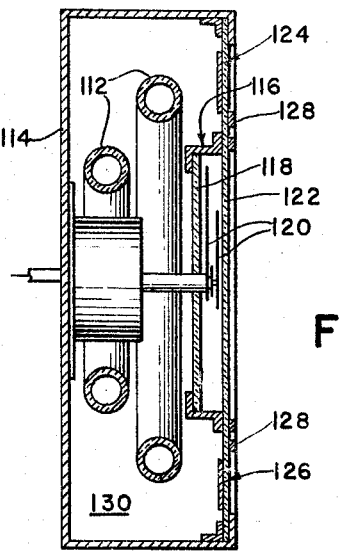
FIGURE 14 is a cross section taken along line 14—14 of FIGURE 12.

Referring first to FIGURES 12, 13 and 14, a first embodiment of a display means providing multiple and special effects of visible backlighting, black field backlighting and sidelighting with photoluminescent overtones will now be described.

A cabinet structure 106 comprises a central housing portion 108 and a pair of open wells 110 one on either side of the said central portion.

The central portion 108 includes an internal rearwardly disposed light source 112 of circular fluorescent lamps or the like, an opaque rear wall 114 and a front wall assembly 116.

The front wall blackfield assembly 116 comprises a clock means having a face comprising first filter element 118, transmitting at the blue end of the spectrum, adjacent the light source 112 and partially coextensive therewith, photoluminescent hands 120, adjacent the first filter element 118 and a second filter element 122 covering the front face of the central blackfield assembly housing and preventing view of the light source 112, the said first filter having a sharp cut-off characteristic with respect to the blue end of the spectrum. In the embodiment of FIGURE 13, the remaining area of the obverse face of central portion 108 of this display is of a third-preferably translucent light transmitting material 122(b) which may be blue or white in its entirety having a perforated opaque overlay 122(c) to define its hours markings. Upper and lower sign panels 124 and 126 comprising indicia directly affixed by suitable means directly to exposed illuminated areas of this third display element 122(b) beyond the confines of assembly 116 and of the first filter 118 whereby direct illumination without the blackfield effect is had of the said signs 124 and 126 as well as the hours symbols 128 and such illumination will be of colors and intensities that are independent of the optical characteristics of filter 122.

Another special effect shown in FIGURE 14 is to place the clock dial indicia 128 on the second filter element 122 which in this variation extends beyond the confines of assembly 116 and of the first filter element 118, whereby direct backlighting of the dial indicia 128 and blackfield backlighting of the hands 120 are simultaneously effected.

In the end wells 110, the side walls 130 of the central housing portion 108 comprise filter means for transmitting the blue end of the spectrum. The other walls 132 of the cavities are then lined with selectively colored photoluminescent indicia which fluoresce to provide contrasting effects in the blue light emitted from the filter walls 130.

Thus, there is provided a single display wherein, under the present invention, pure photoluminescent, backlighted illuminated field and backlighted black field effects may be simultaneously rendered.

Figure 15:
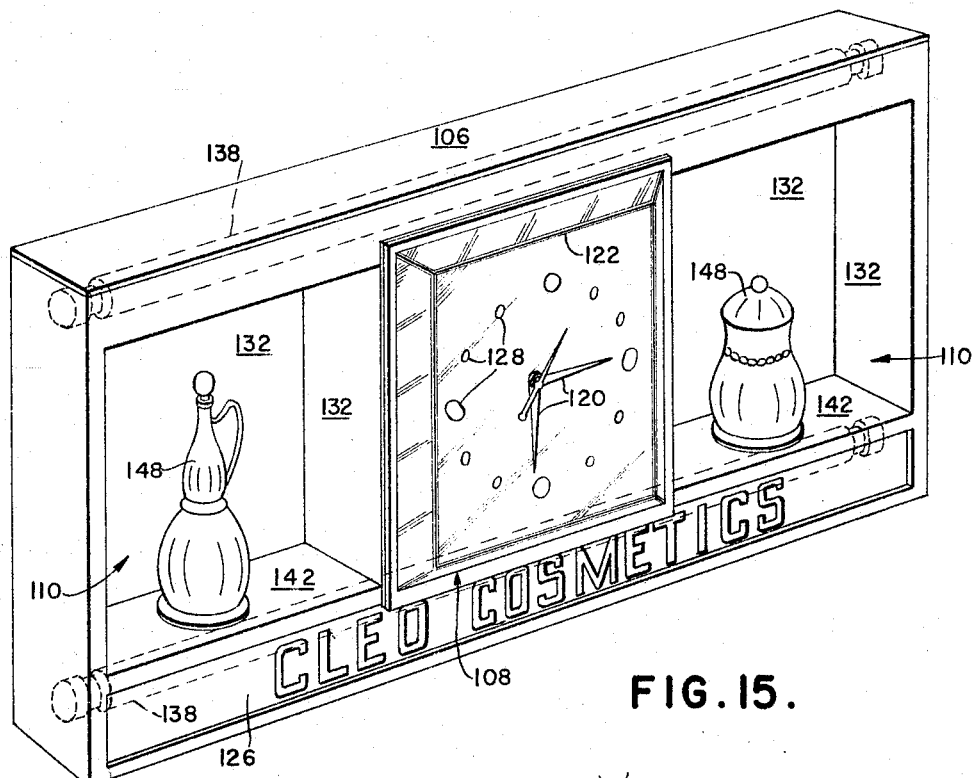
FIGURE 15 is a perspective of a second embodiment of a special effects display means of the present invention.
Figure 16:
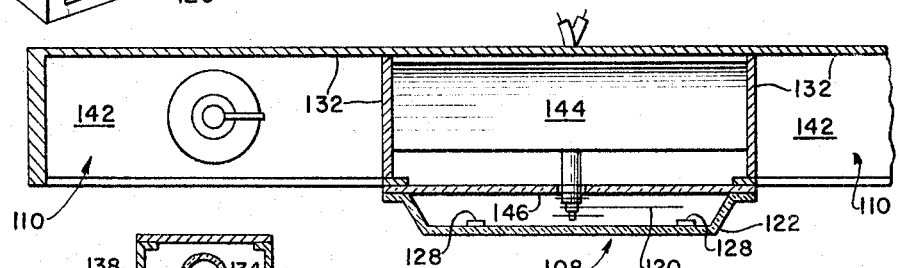
FIGURE 16 is a cross section taken along line 16—16 of FIGURE 15.
Figure 17:
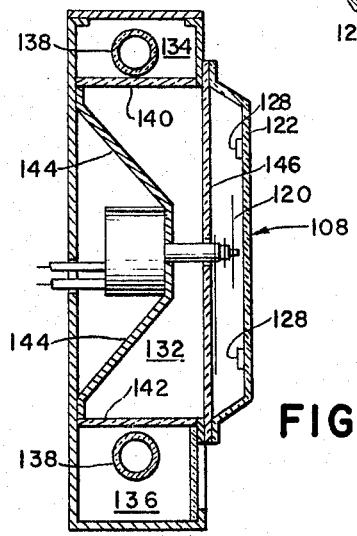
FIGURE 17 is a cross section taken along line 17—17 of FIGURE 15.

Another embodiment wherein indirectly or reflectively lighted black field illumination is provided simultaneously with sidelighting of three dimensional aesthetic forms with color tones controlled by photoluminescence will now be described referring to FIGURES 15, 16 and 17, like numerals being used to designate like elements to the embodiment of FIGURES 12, 13 and 14.

Longitudinally extending upper and lower light bays 134 and 136, respectively, each enclosing elongated fluorescent tube sources 138 are provided in the housing 106 with the respective lower and upper walls 140 and 142 thereof comprising blue transmittance filter elements admitting black light to the central housing 108 and end wells 110. A reflector element 144 in the central housing 108 is located behind the second filter element 122, the clock hands 120 and the dial indicia 128, the latter two comprising photoluminescent material. A translucent sheet 146 is placed between the reflector 144 and the rest of the clock means whereby a backlighted opaque field effect is provided for the clock hands 120 and dial indicia 126, the reflector element 144 providing a virtual location of the sources behind sheet 146. Fluorescent lamps 138 may be of the "BL" phosphor type which emit a maximum of energy in the spectral range useful for photoluminescent excitation and additionally may be of the "BLB" type which have in addition an integral dark blue filter glass envelope. The designations "BL" and "BLB" are well-known in the fluorescent lamp industry, the BL type being of much lower cost and the type preferred for most embodiments of this invention.

Particularly when "BLB" lamps having little visible light are used, the end wells 110 may be lined at 132 as in FIGURES 12–14 with photoluminescent selectively colored materials that contribute visible light to three dimensional aesthetic forms 148 which may or may not be photoluminescent, but which, in any event will be illuminated by sidelighting from the sources 138 and side and backlighting from the material on the walls 132.

The lower translucent sign means 126 is illuminated directly as in FIGURES 12–14.

Figure 18:
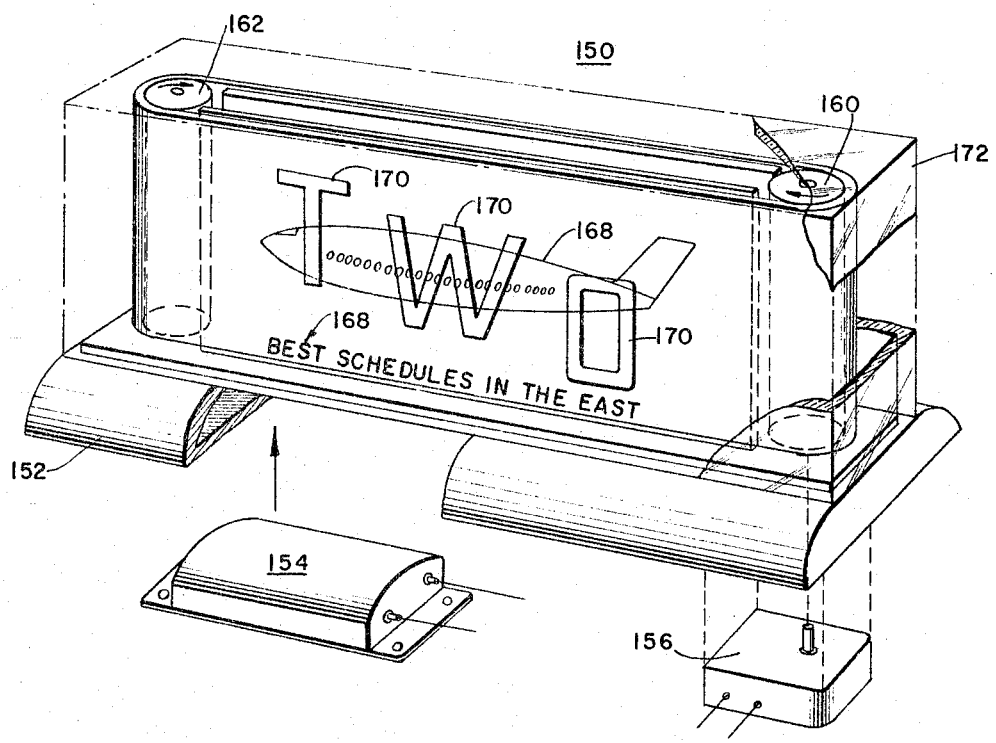
FIGURE 18 is a perspective of a third embodiment of a special effects display means of the present invention which includes multi-directional obverse surfaces.
Figure 19:
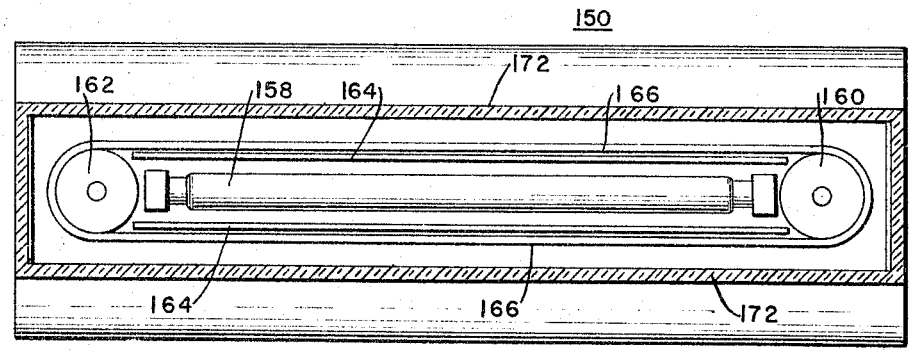
FIGURE 19 is a top plan view of the embodiment of FIGURE 18 with the upper edge thereof cut away.

Other special effect displays which are materially enhanced in simplicity and compactness are the bi-directional or two-sided panels and simultaneously fixed and moving backlighted black field indicia displays. These types are illustrated in the embodiment of FIGURES 18 and 19 which will now be described.

The display assembly 150 includes a base 152 having a ballast and starter pack 154 and a drive motor 156 therein, the former being electrically connected with a fluorescent lamp or lamps 158 disposed centrally and longitudinally on said base 152 and the latter driving a vertical drive roller 160 mounted on the said base 152 at one end of the said lamp 158. An idler roller 162 is similarly disposed at the opposite end of the lamp 158.

On either side of the lamp 158 and longitudinally coextensive therewith are a blue transmittance first filter means 164 generally rectangular in shape, vertically disposed, substantially mutually parallel, and mutually coextensive.

A translucent or transparent endless belt 166 is provided which passes around the drive and idler rollers 160 and 162 across the obverse surfaces of the first filter means 164. Suitable photoluminescent indicia 168 such as the aircraft and "BEST SCHEDULES IN THE EAST" are placed on the belt 166 whereby the said indicia appears alternately and progressively at one side and then the other of the said display means 150. Additional photoluminescent indicia 170 are placed on the front or second filter element 172 which completely surrounds the vertical obverse surfaces of the display 150. This second filter element 172 has a sharp cut-off characteristic with respect to the blue end of the spectrum.

Thus, there is provided a series of illuminated indicia and aesthetic forms moving past other illuminated indicia and forms, all of these being simultaneously backlighted from a common source and appearing on a completely black field on opposite sides of the same display.

The extreme versatility of the present invention in special effects display means is further illustrated in FIGURES 20, 21 and 22 in which backlighted black field effects are simultaneously effected on two and three dimensional fixed exhibits, changeable exhibitors and luminescent dynamic fluid effects on a single compact display panel.

The panel 174 is shown as including a rear housing 176 and a first filter layer 178 comprising a front cover means for the housing 176.

A plurality of digital read-out openings 180 are provided in an opaque mask 182 along the lower edge of the first filter layer 178, the latter comprising a blue transmittance filter.

A second filter layer 184 is provided over the entire front area of the rear housing 176 and is spaced from and generally parallel with the said first filter layer 178. The second filter layer 184 has a sharp cut-off characteristic with respect to the blue end of the spectrum.

The digital readout media comprises a transparent or translucent endless tape 186 having photoluminescent numerals 188 thereon in registry with each of the read-out ports 180. The belt is driven by a three roller system comprising a motor 190, drive roller 192 driven by the said motor 190 and idler rollers 194 and 196, respectively, located below and above the said read-out ports 180. A black light source comprising a fluorescent lamp or a convolution of a gaseous discharge "neon" tube 198 is housed inside the span of the belt 186 in a reflector 200 which directs all of the light therefrom through a blue transmittance filter element 202, thence through the belt 186, ports 180 and the second filter layer 184, whereby the numerals 188, from the obverse surface thereof, are illuminated by direct backlighting and appear on a completely black field.

The panel includes additional lamps 198 comprising either individual parallel mounted fluorescent lamps or plural courses of a single "neon" tube source behind the first filter layer 178 in the housing 176.

Static display effects comprise photoluminescent graphic indicia 204 secured to the observe surface of the first filter layer 178 as well as three dimensional objects 206 such as the three component star shown. This star, FIGURE 21, is composed of three concentric separate three dimensional elements: 206(a) a star-shaped solid of light transmitting polystyrene sponge or the like, 206(b) a first enclosing star-shaped, frame-like solid body of similar material, and 206(c) a second star-shaped, frame-like body of similar material. The obverse surface of each element and its side surfaces are painted with contrasting colors of photoluminescent materials and sufficient space exists between the several elements to enable each to be appreciated as a three dimensional figure having shadowless illumination of all sides as well as the obverse surfaces.

Unique dynamic fluid effects are provided under the present invention in a transparent fluid reservoir 208 containing a photoluminescent fluid 210 on the obverse surface of the first filter layer 178. An air pump 212 is provided in the housing 176 having its output line 214 connected at the lower end of the fluid reservoir 208 via a port 216 and its suction line 218 connected to the upper end of the fluid reservoir 208 via a port 220.

When the pump 212 is operating it sets up a stream of rising bubbles or voids 222 in the fluid 210. Since the fluid is fluorescing under the excitation of the light transmitted through the first filter layer 178, the bubbles appear as edge illuminated voids moving through the luminous fluid from the obverse surface of the second filter layer 184, the entire body of fluid 210 being contrasted against a completely black field. For some special effects a non-fluorescent fluid is used but at least one of the walls of reservoir 208 contains a photoluminescent dye which produces visible light that is substantially trapped within the reservoir except where refracted by the rising bubbles.

*Instrumentation*

Of particular importance is the versatility of the present invention in the art of visual read-out instrumentation.

For example, entire panels of instruments in automobiles, aircraft, control centers and the like may be fully illuminated by backlighting such that all of the related indicia are vividly displayed on a black field without the attendant glare of a visible light source.

Figure 23:
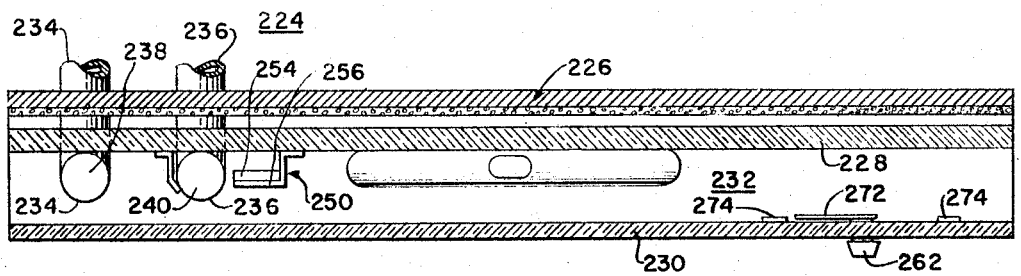
FIGURE 23 is a top plan view of an instrumentation panel of the present invention.
Figure 24:
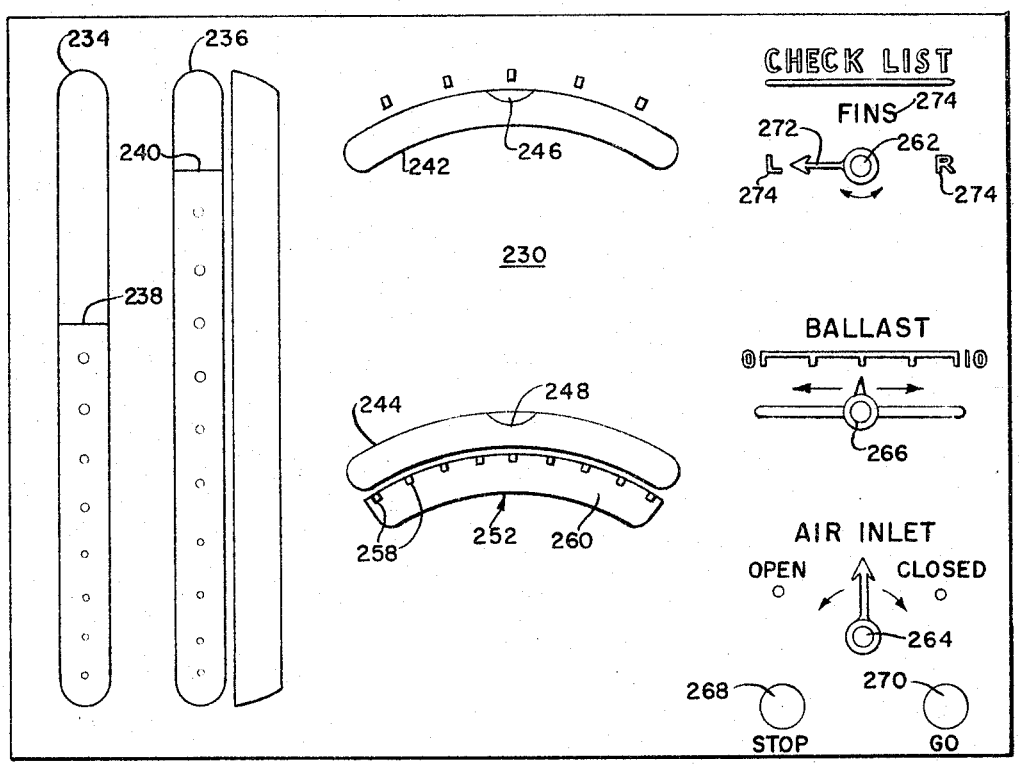
FIGURE 24 is a front plan view of the panel of FIGURE 23.

A first embodiment for a panel display under the present invention will now be described with reference to FIGURES 23 and 24.

The instrument panel assembly 224 is shown as including a photo-exciting source 226, which in this particular instance is a flat electroluminescent source substantially coextensive with the panel assembly 224.

Immediately adjacent the source 226 is a first filter element 228 which transmits the blue end of the spectrum, thus admitting photo-exciting black light at the obverse surface thereof. A second filter element 230 is spaced from but parallel with respect to the first filter 228, defining an intermediate area or chamber 232 therebetween.

The said second filter element 230 has a sharp cut-off characteristic with respect to the blue end of the spectrum.

Within the chamber 232 on the obverse surface of the first filter element 228, are mounted first and second manometer tubes 234 and 236 containing, respectively, photoluminescent and non-photoluminescent fluids 238 and 240.

First and second level indicating means in the form of arcuate bubble tubes 242 and 244, respectively, containing a photoluminescent fluid and bubble 246 and non-photoluminescent fluid and bubble 248, respectively, are mounted one above the other on the obverse surface of the said first filter element 228.

The non-photoluminescent fluid tubes 236 and 244 have photoluminescent edge lighting structures 250 and 252, respectively, associated therewith whereby, from the obverse surface of the second filter element 230, the fluids 240 and 248, respectively, and the bubbles therein will appear as illuminated.

The edge lighting means 250 comprises an edge-glow fluorescent plastic layer 254 facing the obverse face of the first filter element 228 whereby it is caused to fluoresce by the light transmitted through the said first filter from the source 226. An opaque shield 256 is placed across the obverse face of the plastic layer 254 and around one side whereby the tube 236 and the fluid 240 therein are illuminated by the edge glow from the adjacent edge of the plastic layer 254. The edge lighting means 252 is substantially identical, but includes cut-out portions 258 in the opaque shield 260 thereon to effect luminous indicia or indices along the edge of the level tube 244 from the obverse surface of the second filter layer 230.

The combination of normal instrumentation parameters such as control knobs and ordinary control buttons is illustrated by the rotary knobs 262 and 264, the sliding control knob 266 and the pushbuttons 268 and 270, all of which are on the obverse face of the second filter layer 230 while the indicia associated therewith such as the arrow 272 and indicia 274 with the knob 262 are on the reverse surface of the said second filter layer and are of photoluminescent material. The push buttons 268 and 270 may be of photoluminescent material if desired.

Figure 25:
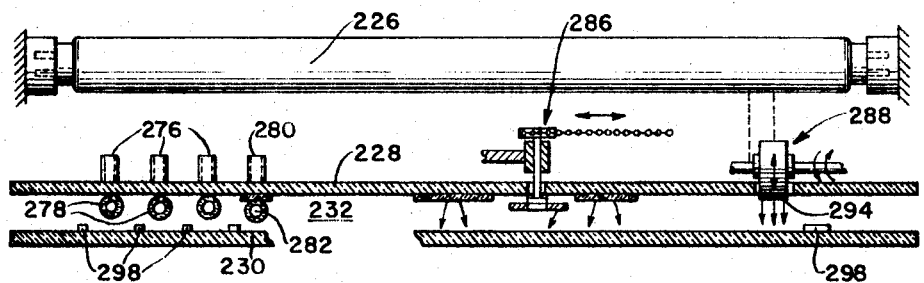
FIGURE 25 is a top plan view of a second embodiment of an instrumentation panel of the present invention.

Another control panel embodiment, wherein like parts bear like numerals to the embodiment of FIGURES 23 and 24, will now be described with reference to FIGURES 25 and 26.

Manometer tubes 276 containing a variety of photoluminescent fluids 278 of various colors are mounted on the obverse surface of the first filter element 228. An additional manometer tube 280 containing mercury 282 is mounted on the obverse surface of a photo-luminescent coextensive strip 282 which, in turn, is mounted on the obverse surface of the first filter element 228. Thus, the meniscus of the mercury 282 appears silhouetted against a luminous background from the obverse surface of the second filter element 230.

When automated or servo-type indications are necessary, suitable motive means such as rotary chain and shaft drives 286 and 288, respectively, are mounted on the source side of the first filter element 228.

The chain drive 288 drives a schematic valve head indicia 290 with relation to a fixed schematic valve seat indicia 292, both of said indicia being of photo-luminescent material and suitably mounted in the cavity 232 between the said first and second filter elements 228 and 230.

A vertically moving endless belt 294 of transluscent material having a photo-luminescent demarcation line or index 296 thereon is located within the cavity 232 and driven by the rotary shaft drive means 288.

The manometer tubes 276 and 284 and the endless belt 294 are indexed for quantitative readout by means of photo-luminescent indices 298 on the rear surface of the second filter element 230.

Multicolor effects for the purpose of quantized readout may be effected as shown in the dynamic operating meter means 300 comprising, for example, a green safety range bracket 302, a yellow scale portion 304, a red scale portion 306 and an "international orange" indicating needle or pointer 308 by the proper choice of various photo-luminescent materials placed on the proper geometric relationships in the cavity 232.

Thus, a wide range of combined effects are provided by the present invention whereby a large plurality of backlighted instruments with a single backlighting source may be caused to stand out in stark individualism on a black field, the normal ambient glare in present day instruments which would be caused by such single source illumination and further, without the attendant confusion and loss of distinction caused thereby.

In the field of automotive and aircraft dashboard instrumentation, black field backlighting techiques under the present invention can fully utilize daylight as the backlighting source, whereby normal operating modes with respect to customary electrical systems therein may be followed during daylight hours.

Referring to FIGURES 27, 28 and 29, several embodiments of this invention as applied to the instrument consoles of aircraft or automobile dash panels will now be described.

In FIGURE 27, is shown an automobile dashboard 310, an automobile speedometer 312 and ammeter (charge indicator) 314, which are to be illuminated by the backlighting blackfield concepts of the present invention.

A photo-exciting source such as a fluorescent lamp 316 is positioned at the rear of the dashboard cavity 318 behind a first filter element 320 which transmits the blue end of the spectrum.

A transluscent or transparent supporting sheet 322 carrying the speedometer indicia 324 and the ammeter indicia 326, and other instruments as desired, is positioned substantially coextensively with the obverse face of the first filter element 320. The indicia 324 and 326 are composed of photo-luminescent material of any desired colors.

The moving or changeable exhibitor portion of the speedometer 312 comprises a transparent or transluscent endless tape 328 or the like having a photo-luminescent index mark or pointer 330 thereon. The tape 328 is extended across and immediately adjacent the obverse surface of the supporting sheet 322.

The entire speedometer assembly is enclosed by a front or second filter element 332 which has a sharp cut-off characteristic with respect to the blue end of the spectrum. This, with the source 316 energized the indicia 324 and 326 as well as the luminous index 330 on the tape 328 luminesce and appear as luminous indicia on a completely black field from the obverse face of the second filter element 332.

It is often desired to have color zones across the face of a speedometer to indicate certain ranges of speed to the driver. This can be readily accomplished by the addition of another filter element such as the third filter strip 334 on the rear face of the second filter element 332 such that, for example, the index mark 330 is seen as a different color from the obverse face of the second filter element 332 for speeds in excess of sixty (60) miles per hour. The tape 328 is merely illustrative, however, and any conventional changeable exhibitors having photoluminescent properties may be used.

For use with conventional automotive electrical systems wherein the instrument lights are only energized under conditions of insufficient visibility, the embodiments of FIGURES 28 and 29 utilize daylight as the photoexciting source.

Figure 26:
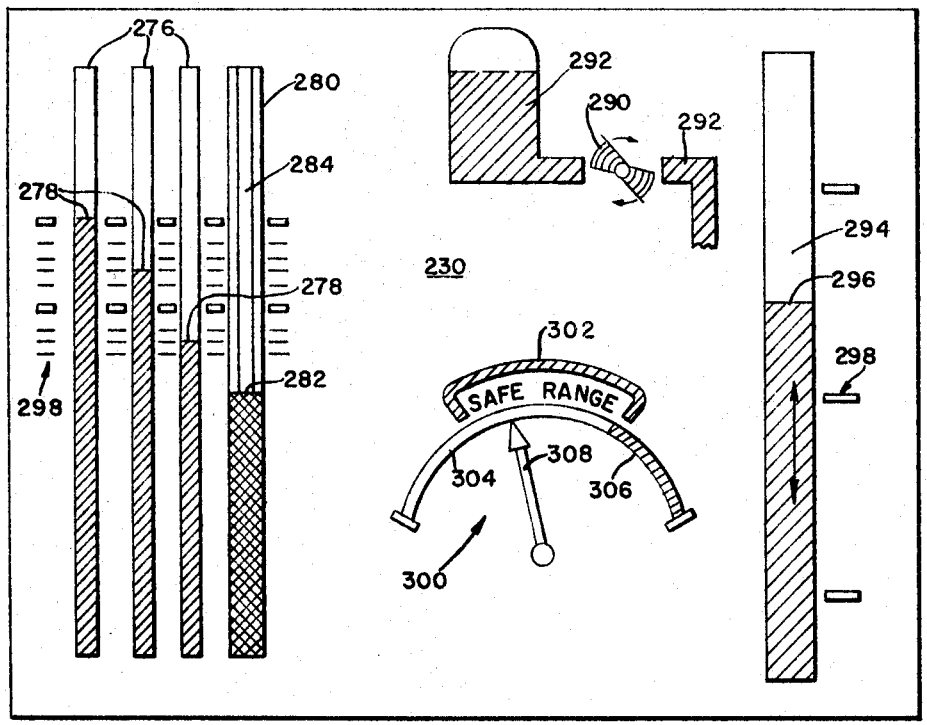
FIGURE 26 is a front plan view of the panel of FIGURE 25.

Referring first to FIGURE 26, the speedometer indicia 324 and the like are shown as being on the obverse face of the first filter element 320 but otherwise, the tape 328, third filter 334 and second filter elements 332 are in the same relative positions as in the embodiment of FIGURE 27.

In this embodiment the speedometer 312 is shown as mounted on top of the dashboard 310 flush with the windshield 336 of the automobile. Immediately adjacent the windshield is a daylight filter element 338 which forms the rear wall of the speedometer 312 and transmits the desired blue end of the spectrum into the rear cavity 340 of the said speedometer.

Coextensive with the rear face of the first filter element 320 is an optical collimating sheet 342 which transmits the daylight from the daylight filter 338 through the first filter element 320 is substantially parallel rays. The collimating sheet 342 also permits the fluorescent lamp source 316 to be mounted at the top of the cavity 340 without losing the effect of backlighting the speedometer 312 when there is insufficient daylight to provide same.

Thus, there is provided backlighted black field illumination of instruments with daylight and/or artificial light as the backlighting source, the eye of a viewer being unable to see either source from the obverse surface of the second filter element 332.

Referring now to FIGURE 29, the collimating sheet 342 of FIGURE 28 has been removed in favor of a reflector 344 surrounding the light source 316 which has been repositioned at the lower end of the cavity 340. The first filter element 320 is positioned across the front of the reflector 344 and the indicia 324 are mounted on a transparent supporting sheet 322 as previously described in the embodiment of FIGURE 27.

The moving tape 328, however, is made of transparent material positioned over a multi-zone colored photo-luminescent strip 346, whereby a similar effect to that disclosed in the embodiment of FIGURE 27 is provided.

The daylight filter 338 is of any desired color, and the indicia 324 are composed of photo-luminescent material such that the black field effect is obviated during daylight driving conditions if such effect is desired. If the daylight filter transmits only the blue end of the spectrum, however, then the black field effect will always be present from the obverse surface of the second filter element 332.

In all of the foregoing embodiments, unless specifically indicated as otherwise, the description of the operation of the illustrated structures has been made with the assumption that the disclosed photo-exciting light sources have been previously energized.

This invention has provided the means by which direct backlighting of photo-luminescent objects may be effected while the objects, to the eye of the viewer, appear as brightly and distinctively illuminated as individual sources on a completely opaque field, rendering the common light source completely invisible even though it be directly in the line of sight. The untold number of possibilities for displaying both fixed and moving, planar and three dimensional objects either alone or in combination without any visible source of illumination on a stark background satisfy a long felt need in the art which has heretofore frustrated all prior attempts at solution.

Further, it should be expressly noted that the combined optical characteristics of the front and rear filters substantially totally absorb all ambient natural and artificial illumination entering through the obverse surface of the display.

Also, it is within the purview of this invention to apply any of the low reflectance multiple layer dielectric coatings known to the art of modern optics to reduce even the minor surface reflections from the front and rear filters of the displays.

It is to be understood that the several embodiments shown and described herein are for the purpose of example only and are not intended to limit the scope of the appended claims.

What is claimed is:

1. Means providing backlighted back field illumination of objects comprising a photo-exciting source, first transmittance means transmitting a first spectral bandwidth from said source, second transmittance means transmitting a second spectral bandwidth other than said first spectral bandwidth, said first transmittance means being intermediate said source and said second transmittance means, and object means of photo-luminescent material intermediate said first and second transmittance means, said first and second transmittance means in combination, being substantially completely opaque to visible light whereby said object means appear individually illuminated against a black field.

2. The invention defined in claim 1, wherein said means further comprises third transmittance means transmitting a third spectral bandwidth intermediate said object means and said second transmittance means.

3. The invention defined in claim 1, wherein said first spectral bandwidth comprises the blue end of the spectrum.

4. The invention defined in claim 1, wherein said first spectral bandwidth comprises the blue end of the spectrum and said second spectral bandwidth includes the green, amber and visible red regions of the spectrum.

5. The invention defined in claim 2, wherein said first spectral bandwidth comprises the blue end of the spectrum, said second spectral bandwidth includes the green, amber and visible red regions of the spectrum and said third spectral bandwidth comprises a preselected portion of said second spectral bandwidth.

6. The invention defined in claim 1, wherein said means further comprises third transmittance means, transmitting a third preselected spectral bandwidth, intermediate said objects and said second transmittance means whereby selective color effects are imposed on said objects at the obverse surface thereof.

7. The invention defined in claim 1, wherein said means further includes motive means for at least some of said objects, whereby said objects are constrained to move on a black field.

8. The invention defined in claim 1, wherein said means further includes support means for said objects intermediate said first and second transmittance means and securing means interconnecting said objects with said support means.

9. The invention defined in claim 8, wherein said support means comprises a plurality of fixed vertical strips and said securing means comprises a plurality of horizontal channel means integral with said strips, said objects being removably receivable in said channel means.

10. The invention defined in claim 8, wherein said support means comprises a transparent sheet and said securing means comprises magnetic means on said transparent sheet and cooperating magnetic means on said objects.

11. The invention defined in claim 1, wherein said means further includes second objects of nonphotoluminescent material intermediate said first and second transmittance means and illuminating means providing backlighted black field illumination of said second objects comprising photoluminescent means adjacent each of said second objects irradiated by said source and opaque shield means over the obverse surface of said photoluminescent means.

12. The invention defined in claim 11, wherein said means further includes a coordinate grid pattern integral with a transparent plastic sheet intermediate said first and second transmittance means and edge lighting means for said plastic sheet comprising a photoluminescent coating about the periphery of the obverse surface and the peripheral edge surface of said sheet irradiated by said source and an opaque coating coterminately superimposed on said photoluminescent coating; and wherein said objects comprise photoluminescent index points selectively movable over said grid pattern.

13. The invention defined in claim 1, wherein said means further includes second objects of nonphotoluminescent material on the obverse surface of said second transmittance means, whereby said second objects are superimposed on said photoluminescent objects.

14. The invention defined in claim 1, wherein said means further includes open cavities, absent said second transmittance means, irradiated by said source through said first transmittance means, said cavities including linings of selectively colored photoluminescent materials and being adapted to receive other objects for display, said other objects being illuminated by the fluorescent response of said linings to the irradiation by said source.

15. The invention defined in claim 1, wherein said means further includes open cavities, absent said second transmittance means, irradiated by said source through said first transmittance means, said cavities being adapted to receive other objects for display, said objects comprising photoluminescent materials whereby they are caused to fluoresce in response to the irradiation by said source.

16. The invention defined in claim 1, wherein said objects include a transparent fluid reservoir intermediate said first and second transmittance means, and a photoluminescent fluid in said reservoir.

17. The invention defined in claim 1, wherein said objects include a transparent fluid reservoir intermediate said first and second transmittance means, a photoluminescent fluid in said reservoir, and generating means providing a continuous stream of bubbles in said fluid.

18. The invention defined in claim 1, wherein said means further includes nonphotoluminescent second objects intermediate said first and second transmittance means comprising transparent fluid reservoir means, a nonphotoluminescent fluid in said reservoir means, photoluminescent means coextensively adjacent one side of said reservoir irradiated by said source and opaque shield means over the obverse surface of said photoluminescent means.

19. The invention defined in claim 18, wherein said means further includes generating means comprising a continuous stream of bubbles in said fluid.

20. Means providing bidirectional direct backlighted black field illumination of objects, which objects appear against a completely blackfield from the obverse surfaces thereof, comprising a photo-exciting source, first and second objects on either side, respectively of said source, first and second transmittance means between said source and said first and second objects, respectively, transmitting a preselected spectral bandwidth from said source to said objects, said objects being comprised of photoluminescent material excitable into fluorescence by the light of said transmitted bandwidth, and third and fourth transmittance means over the obverse surfaces of said first and second objects, respectively, and substantially coextensive with said first and second transmittance means, respectively, having sharp cut-off characteristics to said preselected spectral bandwidth, whereby said source may be directly in line of sight with said first and second objects and be rendered invisible from the respective obverse surfaces thereof while said objects appear distinctively and individually illuminated on a substantially completely blackfield.

21. Means providing directly backlighted black field optical readout for instruments and the like comprising, motive means for said instruments, index means driven by said motive means and scale indicia adjacent said index means providing a readout depending on the position of said index means relative thereto, a photoexciting source adjacent said motive means, first transmittance means separating said source and motive means from said index means and scale indicia transmitting a preselected spectral bandwidth of said source, said index means and said scale indicia being comprised of photoluminescent material, and second transmittance means over the obverse surfaces of said index means and said scale indicia having a sharp cut-off characteristic with respect to said preselected spectral bandwidth, said first and second transmittance means, in combination, being substantially completely opaque to visible light, whereby said index means and said scale indicia appear individually illuminated against a black field.

22. Means providing backlighted opaque field illumination of objects comprising a photo-exciting source, first transmittance means transmitting a first preselected spectral bandwidth from said source, second transmittance means transmitting a second selected spectral bandwidth other than said first bandwidth, said first transmittance means being intermediate said source and said second transmittance means, transluscent means intermediate said first and second transmittance means, and object means of photoluminescent material intermediate said transluscent means and said second transmittance means, said first and second transmittance means, in combination, being substantially completely opaque to visible light.

23. Means providing backlighted black field illumination of objects comprising a photo-exciting source, first transmittance means transmitting a first preselected spectral bandwidth from said source, second transmittance means transmitting a second preselected spectral bandwidth other than said first bandwidth, said first transmittance means being intermediate said source and said second transmittance means and objects means of photoluminescent material intermediate said first and second transmittance means, said first and second transmittance means, in combination, being substantially completely opaque to visible light whereby said objects appear individually illuminated against a black field; and means admitting natural daylight to the source side of said first transmittance means, whereby alternate and augmenting photo-exciting sources are selectively provided.

24. The invention defined in claim 23, wherein said source is offset with respect to the line of sight to the obverse surface of said objects and wherein said means admitting natural daylight comprises collimating means in immediate coterminate proximity with the said source side of said first transmittance means.

25. Means selectively illuminating objects by opaque field backlighting and translucent field backlighting at night and during daylight, respectively, comprising a photo-exciting source, first transmittance means transmitting a first preselected spectral bandwidth from said source, second transmittance means transmitting a second selected spectral bandwidth other than said first bandwidth, said first transmittance means being intermediate said source and said second transmittance means, transluscent means intermediate said first and second transmittance means, and object means of photoluminescent material intermediate said translucent means and said second transmittance means; and means admitting natural daylight intermediate said first transmittance means and said transluscent means, said first and second transmittance means, in combination, being substantially completely opaque to visible light.

26. Means providing direct backlighted illumination of objects comprised of photoluminescent material excitable into fluorescence by the light of a preselected spectral bandwidth, which objects appear individually illuminated against a completely black field, said means comprising a photo-exciting source, first transmittance over the obverse side of said source transmitting a preselected spectral bandwidth from said source capable of exciting photoluminescent materials into fluorescence, and second transmittance means over the obverse surface of said first transmittance means substantially coextensive with said first transmittance means, having a sharp cut-off characteristic to said preselected spectral bandwidth, and being spaced apart from said first transmittance means to provide space therebetween adapted to receive photoluminescent objects for illumination of such objects by said source, said first and second transmittance means, in combination, being opaque, whereby said source may be directly in line of sight with photoluminescent objects to be illuminated thereby and is rendered invisible from the obverse surface of said second transmittance means while photoluminescent objects placed between said first and second transmittance means will appear distinctively and individually illuminated on a substantially completely black field.

References Cited by the Applicant

UNITED STATES PATENTS

| | | | |
|---|---|---|---|
| 2,392,979 | 1/1946 | Douden | 250—71 |
| 2,428,792 | 10/1947 | Evans | 250—72 |
| 2,454,280 | 11/1948 | Hardesty | 88—65 |
| 2,594,903 | 4/1952 | Freedman et al. | 40—135 |
| 2,600,644 | 6/1952 | Hand | 250—72 |
| 2,878,606 | 3/1959 | Meijer | 40—134 |

RICHARD B. WILKINSON, *Primary Examiner.*

LEO SMILOW, *Examiner.*

GERALD F. BAKER, *Assistant Examiner.*